United States Patent
Smith, Jr. et al.

(10) Patent No.: US 6,824,226 B2
(45) Date of Patent: Nov. 30, 2004

(54) ADAPTIVE BRAKE VALVE CUTOUT SCHEME DURING DISTRIBUTED POWER COMMUNICATION LOSS

(75) Inventors: Eugene A. Smith, Jr., Satellite Beach, FL (US); James M. Kiss, Jr., Melbourne, FL (US); Robert C. Palanti, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/361,535

(22) Filed: Feb. 10, 2003

(65) Prior Publication Data

US 2003/0137191 A1 Jul. 24, 2003

Related U.S. Application Data

(63) Continuation-in-part of application No. 10/271,329, filed on Oct. 15, 2002.
(60) Provisional application No. 60/338,925, filed on Dec. 10, 2001, and provisional application No. 60/441,948, filed on Jan. 23, 2003.

(51) Int. Cl.$^7$ .............................................. B60T 11/32
(52) U.S. Cl. ............................ 303/81; 303/7; 303/15; 303/67
(58) Field of Search .......................... 303/81, 128, 67, 303/82, 83, 7, 15, 20; 246/167 R, 169 R, 182 A

(56) References Cited

U.S. PATENT DOCUMENTS

| | | | | |
|---|---|---|---|---|
| 4,013,323 A | * | 3/1977 | Burkett | ................ 303/20 |
| 4,552,412 A | | 11/1985 | Balukin et al. | |
| 4,946,229 A | * | 8/1990 | Deno et al. | ................ 303/33 |
| 5,039,038 A | * | 8/1991 | Nichols et al. | ................ 246/3 |
| 5,332,297 A | | 7/1994 | Cunkelman et al. | |
| 6,375,275 B1 | * | 4/2002 | Smith et al. | ................ 303/3 |
| 6,375,276 B1 | | 4/2002 | Delaruelle | |
| 6,435,623 B1 | * | 8/2002 | Peltz | ................ 303/15 |

* cited by examiner

Primary Examiner—Jack Lavinder
Assistant Examiner—Mariano Sy
(74) Attorney, Agent, or Firm—Carl A. Rowold; John L. DeAngelis, Jr.; Beusse Brownlee Wolter Mora & Maire, P.A.

(57) ABSTRACT

In a distributed power railroad train, an apparatus for equalizing the equalizing reservoir pressure in the remote power unit and the brake pipe pressure in response to airflow into the brake pipe from the remote locomotive. With these pressures equal, the remote unit cannot charge the brake pipe while the lead unit vents the brake pipe to command a brake application at the train railcars.

19 Claims, 6 Drawing Sheets

ADAPTIVE BRAKE VALVE CUTOUT SCHEME DURING DISTRIBUTED POWER COMMUNICATION LOSS

This patent application is a continuation-in-part of U.S. patent application Ser. No. 10/271,329 filed on Oct. 15, 2002, which claims the benefit of U.S. Provisional Patent Application No. 60/338,925, filed on Dec. 10, 2001. This continuation-in-part application also claims the benefit of U.S. Provisional Patent Application No. 60/441,948, filed on Jan. 23, 2003.

FIELD OF THE INVENTION

This invention relates generally to pneumatic braking systems and more particularly to a pneumatic braking system for a train consist comprising a lead locomotive and one or more remote locomotives.

BACKGROUND OF THE INVENTION

One of the most critical aspects of the operation of railroad vehicles is the predictable and successful operation of the air brake system. However the air brake system is subjected to a variety of dynamic effects, not only as a result of the controlled application and release of the brakes in response to changes in brake pipe pressure, but also due to the varying operating conditions encountered by the train. Thus multiple operating scenarios must be considered for the successful design and operation of the air brake system.

At each railcar, a control valve (typically comprising a plurality of valves and interconnecting piping) responds to locomotive operator-initiated changes in the brake pipe fluid pressure by applying the brakes (in response to a decrease in the brake pipe fluid pressure) or by releasing the brakes (in response to an increase in the brake pipe fluid pressure). The fluid within the brake pipe conventionally comprises pressurized air. The control valve at each railcar senses the drop in brake pipe air pressure as the pressure drop propagates along the brake pipe. In response, at each railcar pressurized air is supplied from a local railcar reservoir to the wheel brake cylinders, which in turn drive the brake shoes against the railcar wheels. The railcar reservoir is charged by supplying air from the brake pipe during non-braking intervals. Typically, the pressure reduction in the brake pipe for signaling a brake application is about seven to twenty-four psi, with a nominal steady state brake pipe pressure of about 90 psi. The braking pressure applied to the railcar wheels is proportional to the drop in the brake pipe pressure. Thus it can be seen that the brake pipe serves to both supply pressurized air to each railcar for powering the brake shoes during a brake application and also serves as the medium for communicating brake application and release instructions to each railcar.

The railcar brakes can be applied in two different modes, i.e., a service brake application or an emergency brake application. A service brake application involves the application of braking forces to the railcar to slow the train or bring it to a stop at a forward location along the track. During service brake applications the brake pipe pressure is slowly reduced and the brakes are applied gradually in response thereto. An emergency brake application commands an immediate application of the railcar brakes through an immediate evacuation or venting of the brake pipe. Unfortunately, because the brake pipe runs for several thousand yards along the length of the train, the emergency braking evacuation does not occur instantaneously along the entire length of the brake pipe. Thus the braking forces are not uniformly applied at each railcar to stop the train.

After one emergency brake application or two or three service brake applications, the brake pipe must be recharged to its nominal operating pressure by supplying pressurized air from a reservoir on the locomotive into the brake pipe. Effective subsequent brake applications cannot be made until the recharging process has been completed.

FIG. 1 illustrates a typical prior art brake system employed by a railway freight train. In a conventional train having only a lead locomotive, the train brake system comprises a locomotive brake system located on a locomotive 100 and a set of railcar brake systems located on a plurality of railcars illustrated by a railcar 200. The application and release of braking action is controlled by an operator within the locomotive 100, who uses a manually operated brake handle to effect braking action. The locomotive includes an air brake control system 102 for supplying air pressure to or controllably venting a pressurized brake pipe 101 via a brake pipe valve 120. The pressurized brake pipe 101 is in fluid communication with each of the railcars 200 of the train as shown.

The locomotive brake control system 102 comprises an air supply input link 111 for supplying pressurized fluid (air) through which the brake pipe 101 is charged. A flow measuring adapter 113 is connected to the air supply link 111 for measuring the charging rate (as a differential pressure between the air supply an output port 116) of the brake control system 102. The output port 116 of the flow measuring adapter 113 is connected to an input port 121 of a relay valve 117. A bi-directional port 122 of the relay valve 121 is coupled to the brake pipe 101. The relay valve 117 further includes a port 123 coupled through an air pressure control link 103 to an equalizing reservoir 105. The pressure control link 103 is also connected to a pressure control valve 107 through which the equalizing reservoir 105 is charged and discharged in the process of a brake operation. A port 124 of the relay valve 117 is controllably vented to the atmosphere as an exhaust port. Coupled with brake pipe 101 and air pressure control link 103 are respective pressure measuring and display devices 131 and 133. The brake pipe gauge 131 measures the air pressure in the brake pipe 101 and the equalizing reservoir gauge 133 measures-the pressure in the equalizing reservoir 105.

The components of a railcar air brake control system 202, include a control valve 203 having a port 221 coupled to the brake pipe 101. The control valve 203 also includes a port 222 coupled to a pressure storage and reference reservoir 205. Finally, the control valve 203 includes a port 223 coupled to an air brake cylinder 231, comprising a piston 232 connected to a brake shoe 233. An increase in air pressure at the port 223 is fluidly communicated to the piston 232 for driving the brake shoe 233 against the wheels 235 of the railcar 200. Thus the air brake control system 102 of the locomotive 100 controls operation of the pneumatically operated brake shoes 233 at each of the wheels 235 of each railcar 200.

During train operation, the brake pipe valve 120, through which the components of the brake control system 102 are coupled to the brake pipe 101, is open to create a continuous brake pipe fluid path between the locomotive 100 and all of the railcars 200 of the train. The brake pipe valve 120 is controlled by a brake valve cut-out valve 250, that is in turn controlled by a pilot valve 251. The pilot valve 251 can be manually operated by the locomotive operator to close the brake pipe valve 120 when it is desired to terminate brake pipe charging or to disconnect the brake pipe 101 from the locomotive brake control system 102. There are also other valves and control components (not shown in FIG. 1) that automatically terminate brake pipe charging during an emergency brake application by closing the brake pipe valve 120. Each railcar 200 also includes a manually-operated brake pipe valve 240, as shown in FIG. 1.

The brake system is initially pressurized by the operation of the pressure control valve 107, which controls the air supply to the control link 103 to charge the equalizing reservoir 105 to a predetermined pressure. The relay valve 117 is then operated to couple port 121 with the port 122 so that air is supplied there through to the brake pipe 101, charging the brake pipe 101 to the predetermined charge pressure, as established by the pressure of the equalizing reservoir 105. When the brake pipe pressure reaches the predetermined pressure, the pressure at the port 122 (connected to the brake pipe 101) equals the pressure at the port 123 (connected to the equalizing reservoir 105). This condition indicates a charged brake pipe and the fluid flow path from the equalizing reservoir 105 to the brake pipe 101 via the relay valve 117 is closed.

The pressure storage and reference reservoir 205 of each railcar 200 is fully charged from the brake pipe 101 through the control valve 203, thereby establishing a reference pressure for maximum withdrawal of the piston 232 and complete release of the brakes 233 for each of the railcars 200.

To brake the railcars 200, the train operator operates the pressure control valve 107 using the braking handle in the locomotive cab. This operation causes a partial venting of the air pressure control link 103 through the exhaust port of the pressure control valve 107, reducing the pressure within the equalizing reservoir 105. This pressure reduction is sensed by the relay valve 117 at the port 123. In turn, the pressure reduction causes the bi-directional port 122 to be coupled to the exhaust port 124, thereby exhausting the brake pipe 101 to the atmosphere. The venting of the brake pipe 101 continues until the pressure within the brake pipe 101 equals the pressure of equalizing reservoir 105.

As the pressure in the brake pipe 101 falls, the control valve 203 in each of the cars 200 senses the pressure reduction by comparing the brake pipe pressure with the pressure storage and reference reservoir pressure. This pressure reduction causes a corresponding increase in the air pressure applied to the brake cylinder 231 from the port 223, resulting in an application of the brake shoes 233 against the wheels 235 in proportion to the sensed pressure reduction in the brake pipe 101.

Further pressure reductions in the equalizing reservoir 105 by the train operator produce corresponding pressure reductions in the brake pipe 101 and, corresponding additional braking effort by the brake shoes 233 in each of the railcars 200. In summary, the intended operation of the brake system in the cars 200 and specifically the braking effort applied in each of the cars 200, is proportional to the reduction in pressure in the equalizing reservoir 105 within the locomotive 100.

When the locomotive operator desires to release the train car brakes, she operates the pressure control valve 107 via the braking handle, to effectuate a recharging of the air brake system 102. The recharging is accomplished by bringing the pressure within the equalizing reservoir 105 back to its fully charged state by supplying pressurized air via the flow measuring adapter 113 and the relay valve 117. With the equalizing reservoir 105 recharged, there is again a pressure differential (but opposite in sign to the previous pressure drop in the pressure line 103) between the ports 122 and 123 of the relay valve 117 that causes the brake pipe 101 to be charged with pressurized air from air supply 111 through the flow measuring adapter 113 and the relay valve 117. The brake pipe pressure increase is sensed by the control valve 203 in each of the railcars 200 to cause the brake shoes 233 to be released by the action of the brake cylinder 231.

Distributed power train operation supplies motive power from a lead locomotive and one or more remote locomotives spaced apart from the lead unit in the train consist. Distributed train operation may be preferable for long train consists to improve train handling and performance. Each lead and remote locomotive includes an air brake control system, such as the air brake control system 102 discussed above, and a communications system for exchanging information between the lead and the remote units. Conventionally the communications system comprises a radio frequency link and the necessary receiving and transmitting equipment at each of the lead and the remote units.

The description of the present invention below with respect to the brake control system of a remote locomotive in a distributed power train consist refers to the same brake control system components and uses the same reference characters as described above in conjunction with the brake control system of the lead locomotive. Specific mention will be made if the reference pertains only to the lead or only to the remote locomotive.

On distributed power trains equipped with UIC (Union Internationale de Chemins Fer) wagon braking equipment, braking is accomplished by venting the brake pipe 101 at both the lead and remote locomotives, thus accelerating the brake pipe venting and the application of the brakes at each railcar, especially for those railcars near the end of the train. Brake pipe venting at only the lead unit requires propagation of the brake pipe pressure reduction along the length of the train, thus slowing brake applications at railcars distant from the lead unit. For a distributed power train with an operative communications link between the lead and remote units, when the train operator commands a brake application by operation of the brake handle at the lead unit, a brake application command is transmitted to each remote unit over the radio frequency communications link. In response, each remote unit also vents the brake pipe through its respective relay valve 117. Thus braking actions at the remote locomotives follow the braking actions of the lead unit in response to signals transmitted by the communications system. As a result, the entire brake pipe is vented faster than if the venting occurred only at the lead locomotive. A brake release initiated at the lead unit is also communicated over the radio frequency link to the remote units so that the brake pipe 101 is recharged from all locomotives.

If the communications system is inoperative or if the communications link between the lead unit and the remote units is disrupted (for example, if line-of-sight directivity is lost due to track topology or an interfering object), when the lead operator makes a brake application the remote locomotives will not receive the brake application command via the communications system. Thus the brake application is executed by venting the brake pipe only at the lead locomotive, resulting in a slower brake application at all the railcars.

It is known that leaks can develop in the brake pipe, causing unwanted pressure reductions. Thus in one operational mode for a distributed power train, the remote units (and the lead unit) continually charge the brake pipe 101 when the pressure falls below a nominal value (i.e., whenever a brake application is not in progress). A remote unit senses the brake pipe pressure via the relay valve 117, that compares the equalizing reservoir pressure with the brake pipe pressure. Whenever the brake pipe pressure is less than the equalizing reservoir pressure, the brake pipe 101 is charged from the air supply 111 via the relay valve 117 of the remote unit. However, a remote unit should not recharge the brake pipe when a brake application has been initiated at the lead unit.

A dangerous scenario can develop if a brake application command transmitted over the communications link from the lead unit does not reach the remote locomotive while the latter is monitoring and recharging the brake pipe to compensate for pressure reductions caused by leaks within the brake pipe 101. Typically, the recharging process is initiated if the brake pipe pressure falls below a nominal predetermined value. In this situation the remote locomotive continues to recharge the brake pipe 101 as the lead unit is venting the brake pipe to signal a brake application to the railcars 200. This situation can cause dangerously high in-train forces to develop.

One prior art technique for avoiding this scenario is to automatically close the brake pipe valve 120 of the remote unit whenever communications is lost between the lead and the remote locomotive units. With the brake pipe valve 120 closed, the remote units cannot recharge (nor vent) the brake pipe 101. Thus all brake signaling (both brake applications and brake releases) over the brake pipe 101 is initiated from the lead unit. Although under this condition the remote locomotives cannot assist with the brake pipe venting to accelerate brake applications at the railcars 200, the remote locomotives also cannot erroneously recharge the brake pipe while the lead unit is venting it.

The prior art LOCOTROL® distributed power communications system (available from the General Electric Company of Schenectady, N.Y.) incorporates a variant of the technique described above by including a brake pipe flow sensing function at each remote locomotive in a distributed power train. A flow sensor, such as the flow measuring adapter 113 as depicted in FIG. 1, is included in the brake pipe charging path at each remote unit to detect air flow from the air supply through the relay valve 117 to the brake pipe 101. If the flow rate (which is determined by a differential pressure) exceeds a predetermined value, a brake application is declared. That is, the brake pipe pressure has fallen to a value consistent with a brake application (which would have been initiated from the lead locomotive). If concurrently the communications system is inoperative, then in response to the simultaneous occurrence of these two events, the remote unit brake pipe valve 120 is commanded to a cut-out or closed position. Proper execution of the command closes the remote unit brake pipe valve 120. As a result, the brake application initiated by the venting of the brake pipe at the lead unit cannot be countered by pressurizing of the brake pipe at the remote unit.

If the command to cut-out or close the brake pipe valve 120 is not property executed, then the brake valve at the remote unit remains open. There are several possible causes for this scenario, including a failure of the brake valve cut-out valve 250 (i.e., the valve that drives the brake pipe valve into a cut-off or closed configuration), a failure of the pilot valve 251 that drives the brake valve cut-out valve, or a brake pipe valve 120 stuck in the open position. Thus, if the brake pipe valve is not closed or cut-out as commanded, and during a communications system failure the lead unit issues a brake application, then the remote units continue to supply brake pipe recharging pressure while the lead unit is venting the brake pipe to apply the railcar brakes. This sets up an undesirable situation where the front railcars experience maximum braking and rear railcars experience minimum or no braking action. The net result is that the rear of the train can run into the front of the train, causing high in-train forces and possible derailment.

BRIEF SUMMARY OF THE INVENTION

An apparatus and method for a railroad train comprising a fluid-carrying brake pipe for connecting a lead locomotive, one or more remote locomotives, and a plurality of railcars. The train further comprises a communications system for communicating information between the lead and the remote locomotives. Each railcar comprises a brake response system responsive to the brake pipe fluid pressure, as controlled by a brake control system in the lead and the remote locomotives. Each of the lead and remote locomotives is coupled to the brake pipe via a brake pipe valve and comprises an equalizing reservoir in fluid communication with the brake pipe.

A flow detector at the remote locomotive senses fluid flow between the remote locomotive and the brake pipe and provides a flow signal indicative of unexpected fluid flow in the brake pipe. The communications system provides a status signal indicative of its operability. A controller determines the status of the brake control system of the remote locomotive. If the brake system is in a released state, in response to the unexpected fluid flow and the status signal, the controller reduces the equalizing reservoir pressure to a predetermined value. Thereafter the controller controls the equalizing reservoir pressure in response to the flow signal, such that the brake pipe pressure at the remote locomotive is responsive to the equalizing reservoir pressure at the remote locomotive.

BRIEF DESCRIPTION OF THE DRAWINGS

The present invention can be more easily understood and the further advantages and uses thereof more readily apparent, when considered in view of the following detailed description when read in conjunction with the following figures, wherein.

In accordance with common practice, the various described features are not drawn to scale, but are drawn to emphasize specific features relevant to the invention. Reference characters denote like elements throughout the figures and text.

DETAILED DESCRIPTION OF THE INVENTION

Figure 1:
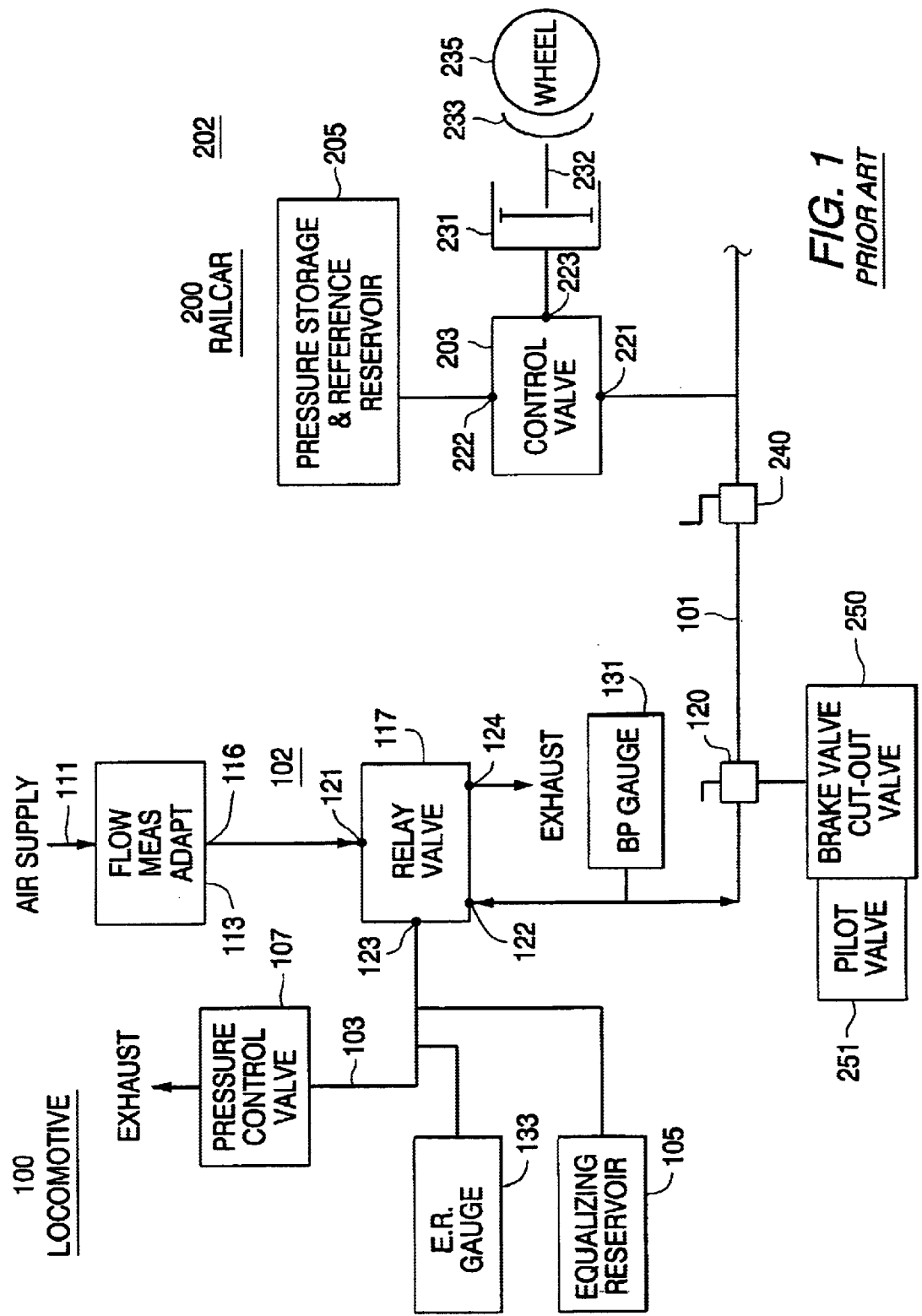
FIG. 1 is a block diagram of a prior art train braking system according to the teachings of the present invention.

Before describing in detail the particular method and apparatus for the control of railroad train braking systems in accordance with the present invention, it should be observed that the present invention resides primarily in a novel combination of hardware and software elements related to said method and apparatus. Accordingly, the hardware and software elements have been represented by conventional elements in the drawings, showing only those specific details that are pertinent to the present invention, so as not to obscure the disclosure with structural details that will be readily apparent to those skilled in the art having the benefit of the description herein.

As applied to distributed power train operation, the present invention detects failures in the brake valve cut-out circuit at a remote locomotive unit and the execution of remedial measures to ensure that a brake application (i.e., venting of the brake pipe 101) initiated at the lead locomotive is not countered by charging of the brake pipe 101 at a remote unit. Thus the teachings of the present ensure that a brake application command issued by a lead locomotive is not countered by brake pipe recharging at a remote locomotive.

Figure 2:
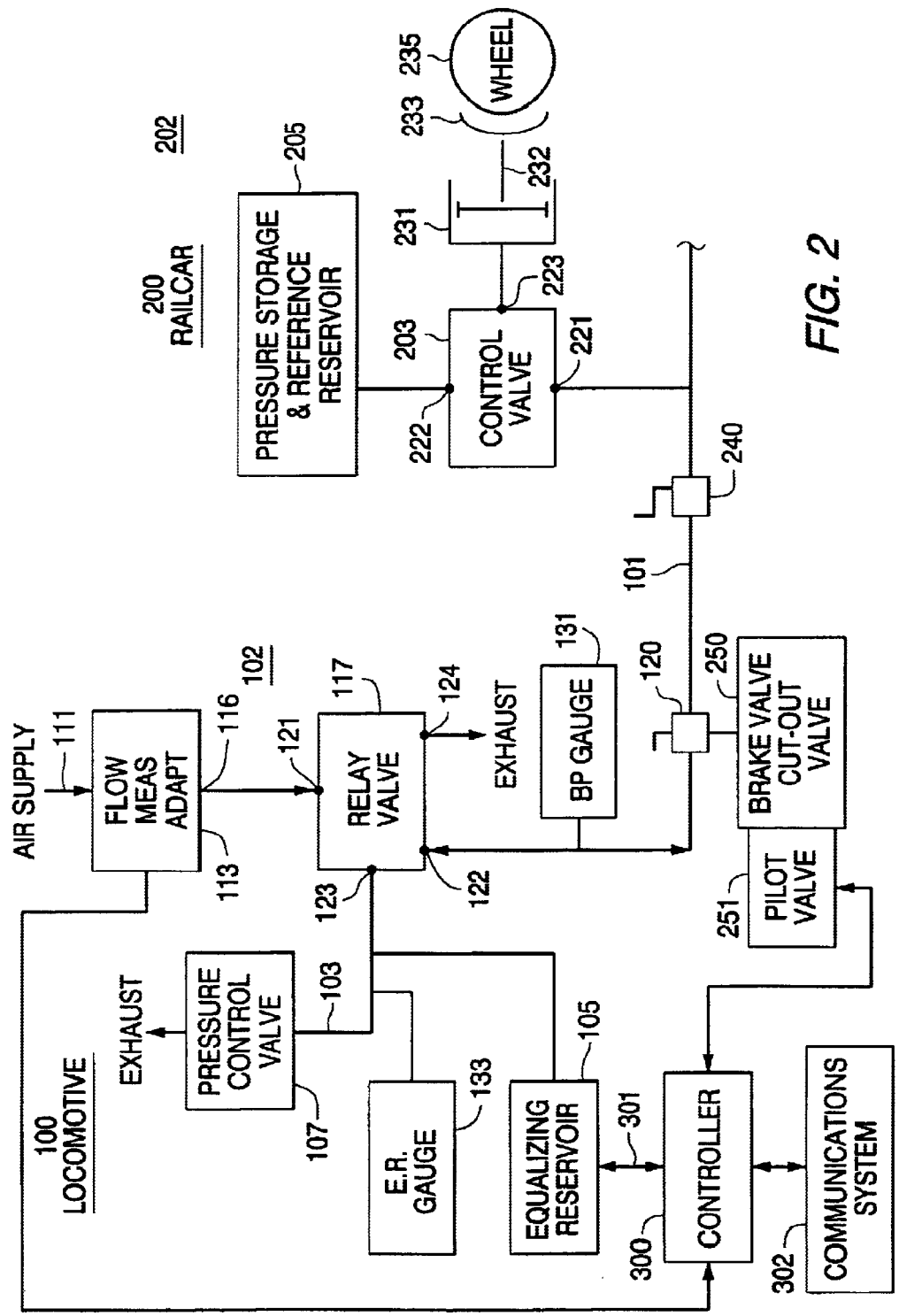
FIGS. 2 and 3 are block diagrams of a train braking system according to the teachings of the present invention.

Turning to FIG. 2, the locomotive 100 of the prior art is augmented with a controller 300, responsive to the flow measuring adapter 113, for controlling the equalizing reservoir pressure via a link 301, and a communications system 302. To execute the teachings of the present invention, the controller 300 is located in a remote locomotive and can optionally be operative in the lead locomotive, although this is not required as the controller 300 functions to control certain air brake components of the remote unit to avoid the potentially destructive braking scenarios described above. The communications system 302 comprises the various elements as discussed above that provide communications between the remote power unit and the lead power unit.

Under normal operating conditions, the brake pipe 101 is charged from the remote unit whenever the remote unit detects a drop in the brake pipe pressure as determined by the remote unit relay valve 117. As described above, this mode is operative to overcome the effects of brake pipe leaks. The brake pipe valve 120 of a remote power unit can be commanded out (also referred to as commanded closed or cut-off) by a message sent from the lead unit over the communications channel to the communications system 302 of the remote unit. The command is processed through the controller 300 to electrically actuate the pilot valve 251, thereby supplying air pressure to the brake valve cut-out valve 250, that in turn closes the brake pipe valve 120. When the brake pipe valve 120 is cut-off or cut-out, the airflow from the remote unit into the brake pipe 101 falls to zero. Thus the brake pipe 101 cannot be charged (or vented) from the remote unit.

If there is a failure in the brake valve cut-out circuit (that is, the components engaged in the operation of cutting off or closing the brake valve at the remote unit) the fluid path from the remote unit to the brake pipe 101 remains open. The flow of charging air into the brake pipe 101 from the remote unit is detected by the flow measuring adapter 113 at the remote unit.

In one embodiment of the present invention, whenever there is an interruption in the communications system between the lead and the remote locomotives of a distributed power train consist, the remote unit takes control of its brake valve 120. Specifically, a signal indicating that the communications system is not operative is provided by the communications system 302 to the controller 300. In response, the controller 300 commands the brake valve 120 on the remote unit to close by supplying an electrical signal to the pilot valve 251, which in turn supplies air pressure to the brake valve cut-out valve 250, which in turn closes the brake pipe valve 120. If this command is properly executed, the flow measuring adapter 113 at the remote unit senses no airflow into the brake pipe 101 from the air supply and provides a representative signal to the controller 300.

If the command is not properly executed, then a failure has occurred in the brake valve cut-out circuit and the flow measuring adapter 113 detects airflow into the brake pipe 101 whenever the remote unit equalizing reservoir pressure is not equal to the brake pipe pressure. In response, a representative signal is provided from the flow measuring adapter 113 to the controller 300. The failure of the brake valve cut-out circuit can be caused by any one or more of the following: the remote brake valve 120 is inoperable or stuck in the open position and cannot be closed by the brake valve cut-out valve 250, the brake valve cut-out valve 250 did not operate properly, or the pilot valve 251 did not function properly. Responsive to a brake valve cut-out circuit failure, the lead locomotive is alerted immediately if possible, or later when communications service is restored, by a signal generated by the controller 300 and transmitted to the lead locomotive via the communications system 302. In response to this condition, in one embodiment the lead locomotive commands the train to an emergency operational mode.

The present invention teaches an apparatus and method for avoiding brake pipe recharging from the remote unit under conditions when the brake pipe valve 120 has been commanded closed, but remains open. The present invention is thus operative whenever the flow measuring adapter 113 detects airflow into the brake pipe 101 when the brake pipe valve 120 has been commanded closed. For example, the brake pipe valve 120 is commanded closed during a communications system interruption as mentioned above. In response to a command to close the brake pipe valve 120 and the detection of airflow into the brake pipe 101, the controller 300 lowers the pressure of the remote unit equalizing reservoir 105 via the link 301 (referred to as a pressure bleed down) until the airflow detected by the flow measuring adapter 113 reaches zero. In one embodiment the equalizing reservoir pressure is reduced in small increments until the pressure equilibrium is reached. Once the equalizing reservoir pressure and the brake pipe pressure are equal, the remote unit cannot recharge the brake pipe 101, since the recharging process is based on a pressure differential between the equalizing reservoir 105 and the brake pipe 101. Advantageously, if the remote unit cannot charge the brake pipe 101, then brake applications initiated at the lead unit will not be countered by pressure increases at the remote unit, which is a possible scenario according to the prior art distributed power train system.

The process of equalizing the brake pipe pressure and the equalizing reservoir pressure continues so long as airflow is sensed by the flow measuring adapter 113. Thus if the lead locomotive unit initiates a second brake application by a further reduction in the brake pipe pressure, when the pressure reduction propagates to the remote unit the flow measuring adapter 113 detects airflow due to the pressure differential between the remote unit equalizing reservoir 105 and the brake pipe 101. In response the controller 300 initiates the equalizing reservoir bleed-down process until the airflow falls to zero. Reduction of the equalizing reservoir pressure continues, as needed, to follow the brake pipe pressure reductions initiated at the lead unit, thus maintaining zero airflow into the brake pipe 101 at the remote unit.

In addition to initiation of the method according to the present invention whenever the remote unit brake valve has been commanded closed, the method can also be activated under any conditions when the flow measuring adapter 113 detects airflow into the brake pipe 101 during a brake application. For instance, in another embodiment, the lead and remote units can operate on the basis of a time-based or triggering-event braking algorithm, such that at predetermined times or in response to predetermined triggering events (a trackside actuator, for example) the train brakes are applied. If the remote unit flow measuring adapter 113 detects airflow into the brake pipe 101 at the remote unit when the brakes should be applied, then in response thereto, under control of the controller 300, the equalizing reservoir pressure is reduced, as discussed above, so that the lead unit braking application can propagate along the brake pipe 101. As in the scenario discussed above, this technique avoids a situation where the lead unit is commanding a brake application while the remote unit is pressurizing the brake pipe 101.

Thus, according to the teachings of the present invention, in a situation where there has been a failure to cut out or close the brake pipe valve 120 at the remote unit, such that the brake pipe 101 can be charged from the remote unit when the operator in the lead unit makes a brake application, the remote unit detects airflow into the brake pipe and in response thereto the pressure in the equalizing reservoir is reduced until the airflow drops to about zero, such that the pressure of the equalizing reservoir in the remote unit is about equal to the brake pipe pressure. Note that since the brake pipe pressure is also equal to the equalizing reservoir pressure in the lead unit, then the remote unit equalizing reservoir pressure is about equal to the lead unit equalizing reservoir pressure. In this way, the brake applications originated at the lead locomotive are permitted to propagate throughout the train.

Figure 3:
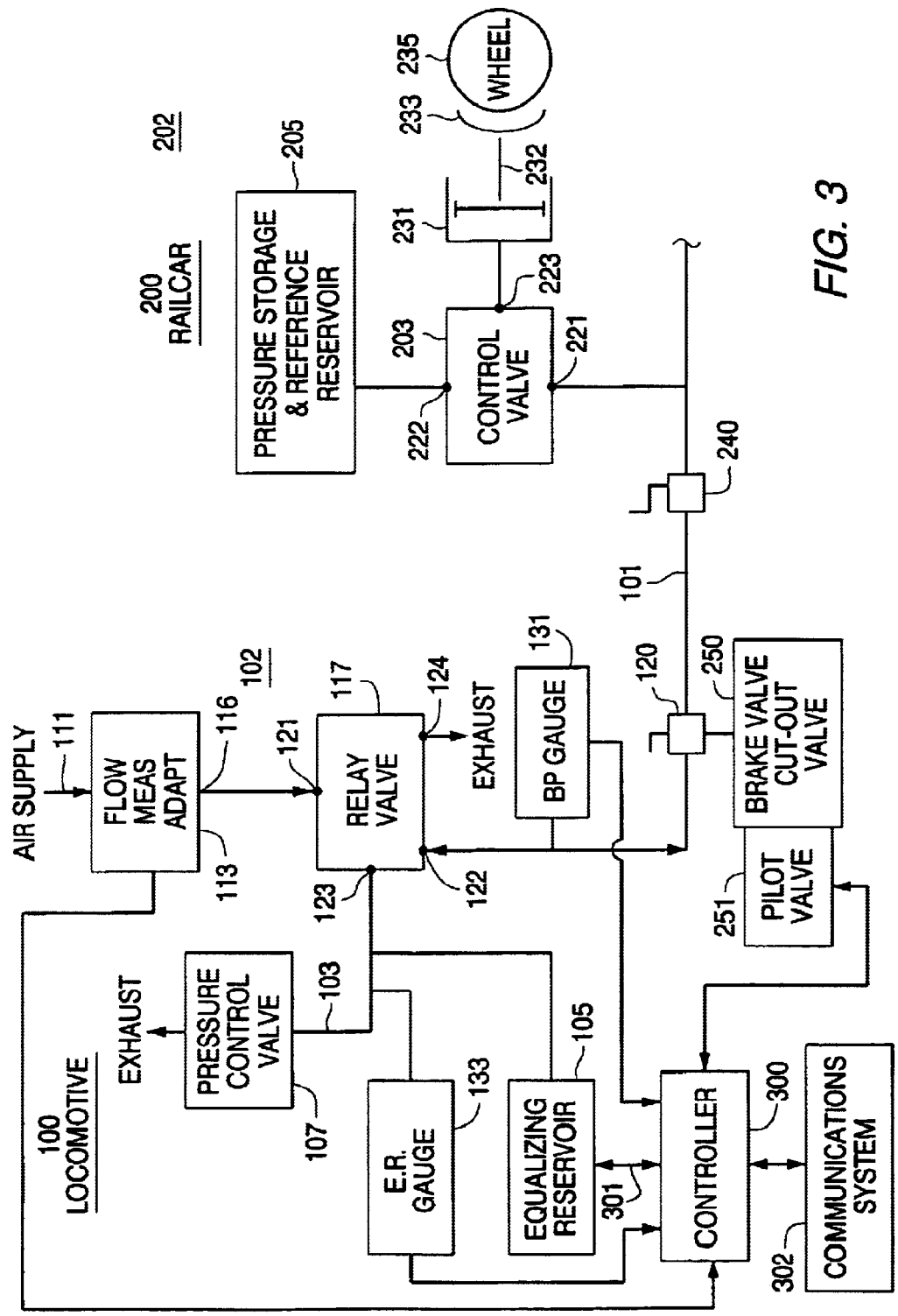

In another embodiment of the present invention, as illustrated in FIG. 3, in lieu of the flow measuring adapter 113 detecting air flow from the air supply into the brake pipe 101, the controller 300 measures the brake pipe pressure (via the brake pipe gauge 131) and the equalizing reservoir pressure (via the equalizing reservoir gauge 133). If there is a difference between these two pressure values during a period when the brake pipe valve 120 has been commanded closed, then the equalizing reservoir 105 is bled until the two pressures are equal, at which point the equalizing reservoir 105 is unable to charge the brake pipe 101 and counter a brake application signaled by the lead locomotive unit. In another embodiment, in lieu of the flow measuring adapter 113, a flow measuring device (not shown) can be disposed within the brake pipe at the remote unit for detecting fluid flow into the brake pipe from the remote unit.

In yet another embodiment, rather than bleeding down the equalizing reservoir as described above in various embodiments, the equalizing reservoir 105 can be evacuated through the pressure control valve 107 under control of the controller 300. Once evacuated, the equalizing reservoir 105 is unable to charge the brake pipe 101 and thus cannot counter a brake application signaled by the lead locomotive unit.

Figure 4:
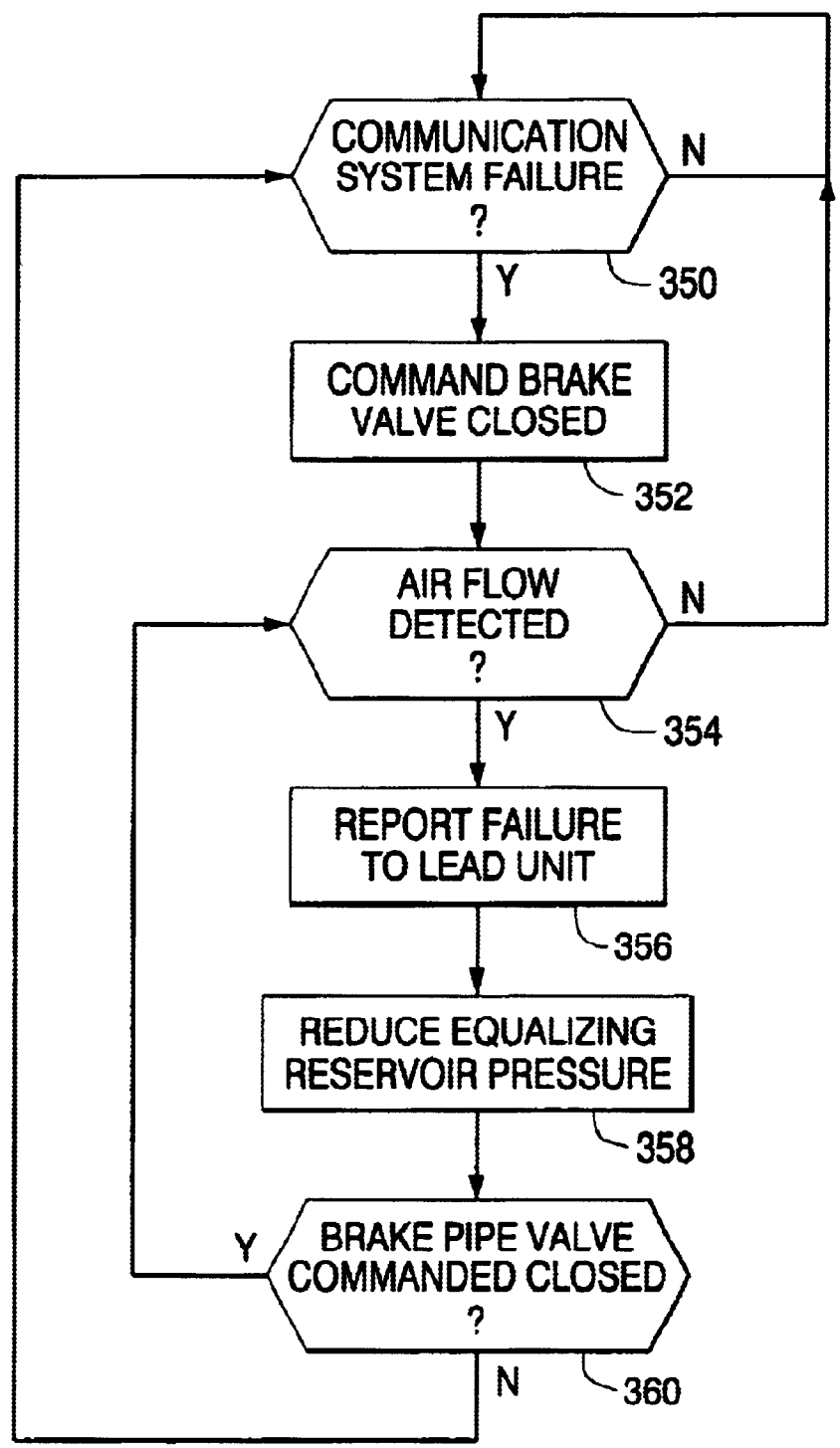
FIGS. 4 through 7 are flow charts illustrating the steps associated with the train braking system according to various embodiments of the present invention.

FIG. 4 is a flow chart depicting the method according to the present invention for controlling brake pipe charging and venting at the remote locomotives of a distributed power train consist. A decision step 350 determines whether the communications system between the remote locomotive and the lead locomotive is operative. There are several known techniques for accomplishing this, including transmitting a test signal at regular intervals between the lead and remote units and measuring one or more signal metrics (e.g., signal-to-noise ratio, bit error rate) at the receiving end. If the communications system is functioning properly, when brake applications are initiated at the lead unit a braking signal is sent to and received at the remote units. In response the remote units also initiate a brake application by venting of the brake pipe. If the communications system is not operating properly, brake applications at the lead unit will not be assisted by brake applications at the remote units, and worse, the remote unit may recharge the brake pipe while the lead unit is lowering the brake pipe pressure to initiate a brake application. Further, as discussed above, there are conditions, other than a failure of the communications system, for which the process of FIG. 2 is operative. In those cases, the decision step 350 is replaced with a decision step to determine whether any such other condition exists. One example of such a condition is whether a track actuator has commanded a brake application.

If the result of the decision step 350 is negative the communications system is operating properly and the process loops periodically back through the decision step 350. If the response is positive, the process proceeds to a step 352 where the brake pipe valve 120 is commanded closed. As described above, this can be accomplished by operation of the pilot valve 251, which in turn operates the brake valve cut-out valve 250 for closing the brake pipe valve 120. Following the step 352, a decision step 354 determines whether the flow measuring adapter 113 detects airflow from the air supply into the brake pipe 101. If no airflow is detected then the brake valve 120 is apparently closed and the process returns to the decision step 350. In lieu of an flow detector such as the flow measuring adapter 113, the present invention contemplates use of any detector that is capable of determining the position of the brake pipe valve or whether the brake valve is open or closed, such as a valve position detector.

If the result of the decision step 354 is affirmative, then the brake valve has failed to close in response to the command at the step 352. This failure is reported to the lead unit at a step 356. Note that this step is not functionally required for successful implementation of the present invention, but is suggested so the train operator is made aware of the failed attempt to close the brake pipe valve.

As described above, if the brake pipe valve at a remote unit is open while the lead unit attempts to vent the brake pipe to command a brake application, then the railcars beyond the remote unit may not see the declining brake pipe pressure as the remote unit will attempt to recharge the brake pipe as the lead unit attempts to vent it. These railcars will thus not engage their brakes. To resolve this problem, in one embodiment (not illustrated in FIG. 4) the train goes into an emergency operating mode in response to the failure of the brake valve to close. In the FIG. 4 embodiment, the equalizing reservoir pressure at the remote unit is reduced at a step 358, with the objective of attaining an equalizing reservoir pressure equal to the brake pipe pressure. At a decision step 360 a determination is made as to whether the brake pipe valve 120 is still commanded closed. An affirmative response returns the process to the decision step 354 for determining whether airflow is detected by the flow measuring adapter 113. As long as airflow is detected, the equalizing reservoir pressure is reduced at the step 358. Thus after several passes through the loop comprising the decision step 354, the step 356 (once the lead unit has been advised of the failure of the brake pipe valve to close, this step can be bypassed on subsequent passes through the loop), the step 358 and the decision step 360, the equalizing reservoir pressure will eventually equal the brake pipe pressure and the result from the decision step 354 will turn affirmative. By equalizing the pressure of the remote unit equalizing reservoir and the brake pipe, the remote unit cannot charge the brake pipe while the lead unit is attempting to vent it.

Figure 5:
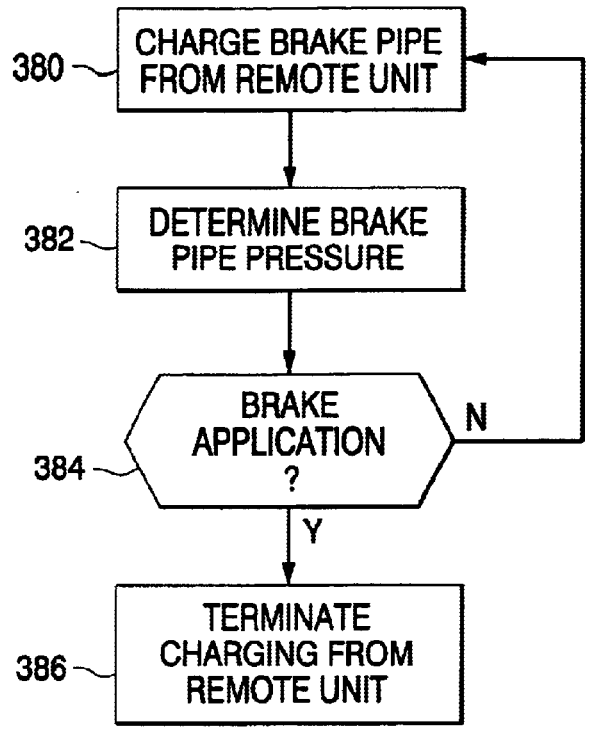

FIG. 5 illustrates another method according to the teachings of the present invention. Whenever brake pipe charging is permitted from the remote unit, as represented by a step 380, the brake pipe pressure is determined at step 382. If a brake application is in process, as determined by a falling brake pipe pressure at the step 382, then brake pipe charging is terminated (see a step 386) at the remote unit such that the remote cannot charge the brake pipe while the lead unit is attempting to vent it. If no brake application has been determined, the process returns to the step 380.

Figure 6:
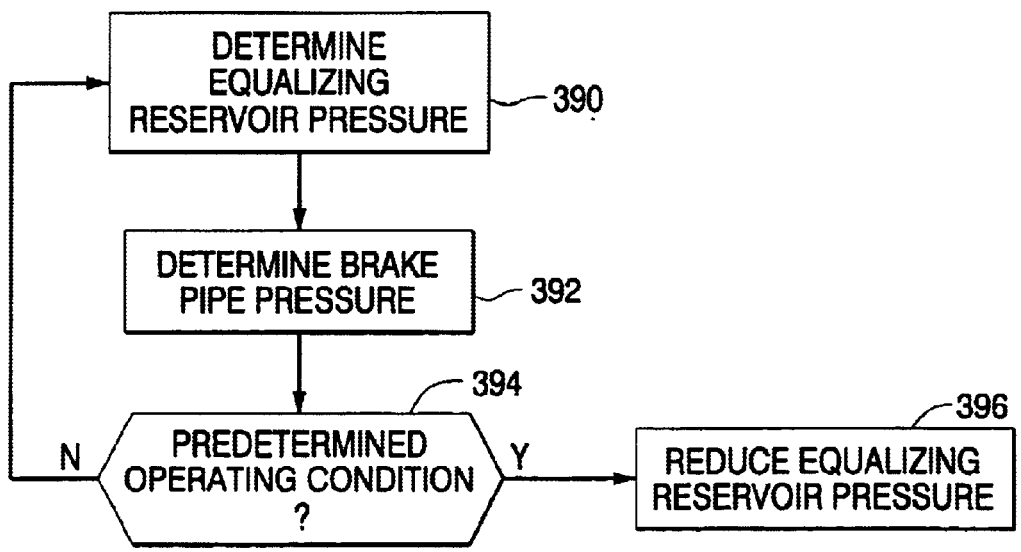

According to the embodiment of FIG. 6, the equalizing reservoir pressure is determined at a step 390 and the brake pipe pressure is determined at a step 392. If the equalizing reservoir pressure exceeds the brake pipe pressure during a predetermined operating condition, as indicated at a step 394, then the equalizing reservoir pressure is reduced.

Figure 7:
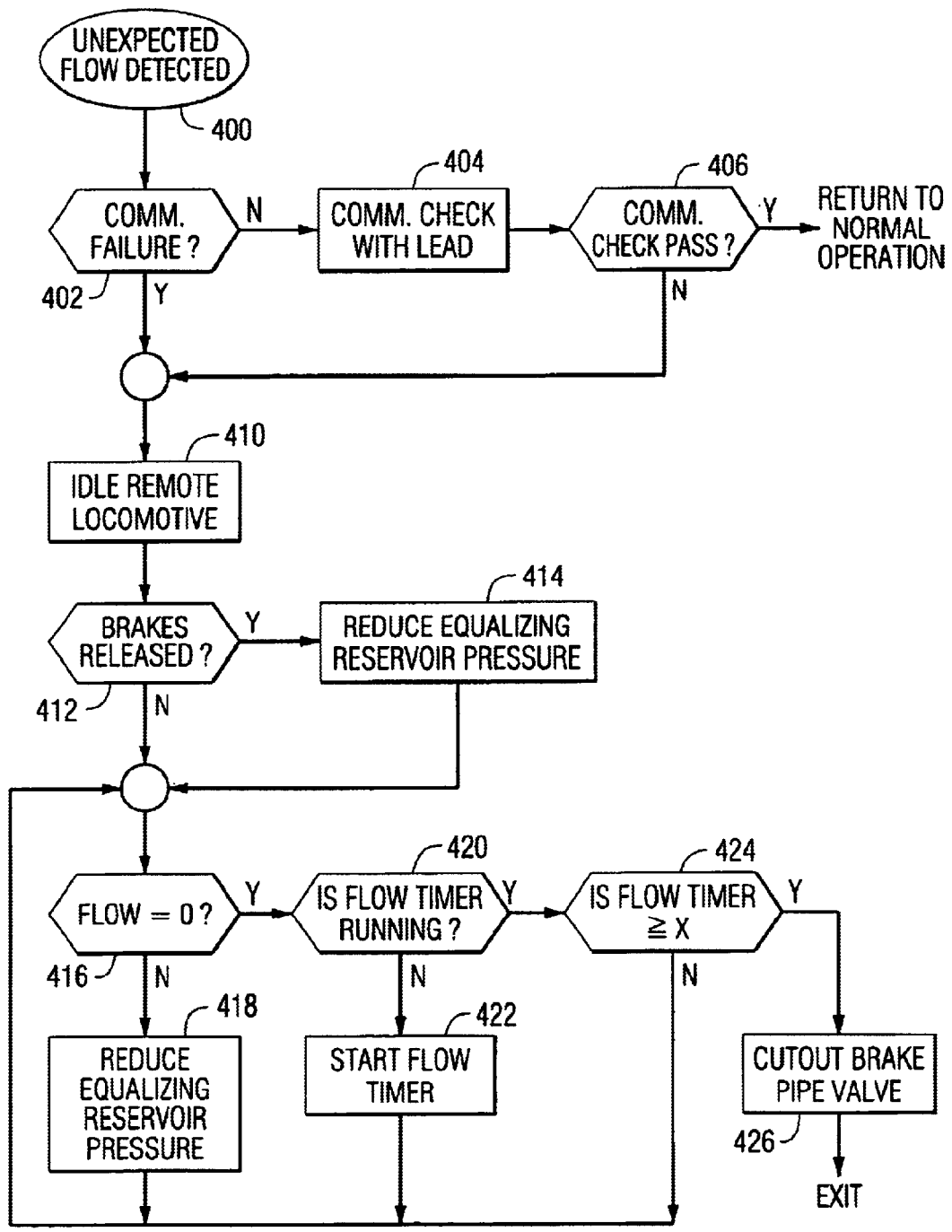

FIG. 7 illustrates a flow chart for yet another embodiment of the present invention. In this embodiment, during communications interruptions between the lead locomotive and the remote locomotives, the latter attempts to follow the braking action initiated at the lead locomotive to assist with the propagation of brake application and release commands at the remote unit. Note that in certain embodiments discussed above, the remote unit is cut-off from the brake pipe 101 (by closure of the brake pipe valve 120) during communications systems failures, and thus cannot assist with the brake pipe venting during a brake application and cannot assist with brake pipe recharging following braking action.

Beginning at a step 400, when the flow measuring adapter 113 detects unexpected air flow within the brake pipe 101, the process moves to a step 402. As discussed above, in a distributed power train control system, the lead unit and the remote unit communicate over a communications link. Brake application and brake release commands are sent over the link from the lead unit for execution at the remote unit. Thus, an unexpected air flow could occur when the brake pipe flow sensed by the flow measuring adapter 113 is inconsistent with a brake release or a brake application command transmitted from the lead unit to the remote units. For example, when airflow is detected into the brake pipe following a brake application command. Unexpected air flow can also occur in response to fluctuations in the equalizing reservoir pressure (during cycling of a compressor (not shown in the Figures) that maintains the reservoir pressure, air dryer exhausts, etc.) or fluctuations in the brake pipe pressure (e.g., leakage fluctuations in the brake pipe 101 due to stretch leakage caused when the railcar hoses that interconnect the brake pipe segments associated with each railcar stretch and compress as the railcar travels around a curve).

In response to the detection of unexpected air flow, the process continues to a decision step 402 where a determination is made regarding the operability of the communications link between the remote locomotive and the lead locomotive. During normal operation of the communications system, in one embodiment the lead and the remote units send test or information messages to each other about every 20 seconds. If about 45 seconds elapses during which the remote locomotive does not receive a transmission from the lead unit, then a communication system failure is declared. Thus the decision step 402 determines whether such a communications systems failure has been declared. The process moves to a step 410 if the result of the decision step 402 is affirmative.

If such a failure has not been declared, then the process moves from the decision step 402 to a step 404, where the remote unit transmits a communications test message to the lead unit. If the lead unit responds to the test message, then the result at the decision step 406 is affirmative and the system returns to normal operation.

If the lead unit fails to respond to the remote unit, then the result from the decision step 406 is negative, that is, a communications system failure is declared and the process moves to the step 410.

At the step 410 the process enters an adaptive remote brake application sequence, where the remote locomotive is switched to an idle state. In an idle state the remote locomotive supplies no motive power to the train consist. In this mode, brake applications at the lead unit will not be countered by the application of motive power at the remote units.

At a decision step 412, it is determined whether the remote locomotive was in a released brake state (i.e., the brakes are not applied at the railcars 200) immediately prior to detection of the communications link failure. If the remote was in a released brake state (i.e., the remote unit was not venting the brake pipe to signal a brake application), the pressure of the equalizing reservoir 105 is reduced (by venting through the controller 300 through the link 301). In one embodiment the pressure is reduced to a pressure representative of a minimal service brake application. This process is depicted at a step 414 of FIG. 7. If the remote unit was not in a released brake state, the process continues from the decision step 412 directly to a decision step 416, bypassing the step 414. With the equalizing reservoir pressure at a service brake application value, the remote unit is unable to charge the brake pipe 101 (i.e., in the event the lead unit is venting the brake pipe 101). In lieu of venting the equalizing reservoir 105 through the controller 300 as described above, the controller 300 provides a control signal to the pressure control valve 107 for incrementally venting the equalizing reservoir there through.

Following either the decision step 412 or the equalizing reservoir pressure reduction step 414, the process continues to the decision step 416. The flow measuring adapter 113 (see FIG. 3) monitors flow into the brake pipe to determine whether the flow into the brake pipe 101 has dropped to zero. As described below, the flow monitoring continues for a time period during which brake pipe pressure equalization (and thus zero flow) would be expected. If the flow measuring adapter 113 senses air flow responsive to a falling brake pipe pressure, the remote unit equalizing reservoir pressure is incrementally reduced at a step 418, thus aiding in the brake application process initiated at the lead unit. The path comprising the decision step 416 and the step 418 is repeatedly traversed (and the equalizing reservoir pressure decreased during each traversal through the step 418) until zero flow is detected by the flow measuring adapter 113, after which the process continues to a decision step 420.

At the decision step 420, it is determined whether the flow timer is running. On the first pass through the decision step 420, the process moves to a step 422 where the flow timer is started. The process then loops back through the decision step 416. If the air flow remains at about zero, the process continues from the decision step 416 to the decision step 420 and then to a decision step 424. This decision step 424 determines whether the flow timer has reached a predetermined maximum value. If the flow timer has not reached that maximum value, the process loops back to the input of the decision step 416. Once the flow timer is greater than or equal to the predetermined time (or in another embodiment greater than the predetermined time), the process moves to a step 426 where the brake pipe valve 120 on the remote unit is cut out or closed. In one embodiment, the predetermined time associated with the decision step 424 is about one minute. Thus the flow timer establishes a maximum time during which the flow is monitored. In the event the flow has remained at about zero for the timing interval, then it is assumed that the brake pipe charging or venting event has ceased and normal operation of the distributed power communication system should be re-established. Following the step 426, the distributed power system executes through a series of known process steps to reestablish the communications link between the lead unit and the remote unit, after which the brake pipe valve 252 is opened. Thus, the remote unit has been returned to its operational state prior to the detection of unexpected airflow at the step 400.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth herein. In addition, modifications may be made to adapt a particular situation to the teachings of the present invention without departing from its essential scope. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for a distributed power railroad train wherein a fluid-carrying brake pipe connects a lead locomotive, a remote locomotive and a plurality of railcars, and wherein the lead locomotive issues braking commands to the remote locomotive over a radio frequency communications system between the lead locomotive and the remote locomotive, and wherein each one of the plurality of railcars comprises a brake response system responsive to the brake pipe fluid pressure, and wherein the lead locomotive and the remote locomotive each comprise a brake control system in fluid communication with the brake pipe via a brake pipe valve, wherein the brake control system at each of the lead and remote locomotives controls the brake pipe fluid pressure, the apparatus comprising:

at the remote locomotive:
a flow detector for sensing fluid flow between the remote locomotive and the brake pipe, and for providing a flow signal representative of detected fluid flow;
wherein the radio frequency communications system provides a status signal indicative of the operability of the communications system;
an equalizing reservoir in fluid communication with the brake pipe;
a controller, wherein in response to the status signal, the flow signal, and a last-issued braking command inconsistent with the flow signal, the controller initiates a reduction in the equalizing reservoir pressure, and wherein the controller continues to reduce the equalizing reservoir pressure in response to the flow signal.

2. The apparatus of claim 1 wherein braking system commands are transmitted from the lead locomotive to the remote locomotive over the radio frequency communications system, and wherein a last-issued command inconsistent with the flow signal comprises the flow signal inconsistent with the last braking system command.

3. The apparatus of claim 1 wherein the status signal indicative of the operating condition of the communications system indicates an inoperable communications system.

4. The apparatus of claim 1 wherein the operability of the communications system is determined by sending a signal from the remote locomotive to the lead locomotive and receiving a response from the lead locomotive.

5. The apparatus of claim 1 wherein the communications system is inoperable if the remote locomotive fails to receive a signal from the lead locomotive during a predetermined interval.

6. The apparatus of claim 1 wherein the controller determines the status of the brake control system of the remote locomotive, and wherein if the brake control system status is released, then in response to the last-issued command inconsistent with the flow signal, the controller reduces the equalizing reservoir pressure to a predetermined pressure, after which the controller continues to reduce the equalizing reservoir pressure in response to the flow signal.

7. The apparatus of claim 6 wherein the predetermined pressure represents a service brake application.

8. The apparatus of claim 1 wherein the controller controls the equalizing reservoir pressure until the flow signal indicates substantially no flow from the remote locomotive into the brake pipe.

9. The apparatus of claim 8 wherein when the flow signal indicates substantially no flow for a predetermined time the brake pipe valve at the remote locomotive is closed.

10. The apparatus of claim 9 wherein the predetermined time is about one minute.

11. The apparatus of claim 1 wherein in response to the indication of unexpected fluid flow and the status signal, the remote locomotive is powered to an idle state wherein the remote locomotive provides no motive power to the railroad train.

12. A method for controlling a distributed power railroad train comprising a fluid-carrying brake pipe connecting a lead locomotive, a remote locomotive and a plurality of railcars, further comprising a radio frequency communications system for use by the lead locomotive to issue commands to the remote locomotive, wherein each one of the plurality of railcars comprises a brake response system responsive to the brake pipe fluid pressure, and wherein the lead locomotive and the remote locomotive comprise a brake control system in fluid communication with the brake pipe via a brake pipe valve, wherein the brake control system at each of the lead and remote locomotives controls the brake pipe fluid pressure, the method comprising:

at the remote locomotive:
detecting fluid flow between the remote locomotive and the brake pipe, and in response thereto providing a flow signal representative of detected fluid flow;
determining the operability of the radio frequency communications system and in response thereto providing a status signal representative of the radio frequency communications system status; and
reducing the brake pipe fluid pressure in response to the, the status signal and the flow signal inconsistent with a last issued command.

13. The method of claim 12 further comprising transmitting braking system commands from the lead locomotive to the remote locomotive over the radio frequency communications system, and wherein the flow signal inconsistent with a last-issued command comprises a fluid flow inconsistent with the last braking system command.

14. The method of claim 12 further comprising determining the status of the brake control system of the remote locomotive, wherein if the brake control system status is released, then the step of reducing the brake pipe fluid pressure comprises reducing the brake pipe pressure to a predetermined pressure, after which the reduction in brake pipe fluid pressure continues in response to the flow signal.

15. The method of claim 14 wherein the predetermined pressure represents a service brake application.

16. The method of claim 12 wherein the step of reducing the brake pipe fluid pressure comprises reducing the brake pipe fluid pressure until the flow signal indicates substantially no flow from the remote locomotive into the brake pipe.

17. The method of claim 16 further comprising determining if the flow signal indicates substantially no flow for a predetermined time and closing the brake pipe valve at the remote locomotive after the predetermined time.

18. The method of claim 17 wherein the predetermined time is about one minute.

19. The method of claim 12 further comprising powering the remote locomotive to an idle state in response to the flow signal inconsistent with a last issued command and the status signal.

* * * * *